United States Patent [19]

Vincent

[11] 4,448,262

[45] May 15, 1984

[54] PNEUMATIC HAMMER

[75] Inventor: Robert R. Vincent, Springfield, Mo.

[73] Assignee: Cooper Industries, Inc., Houston, Tex.

[21] Appl. No.: 379,772

[22] Filed: May 19, 1982

[51] Int. Cl.[3] .......... B23Q 5/00

[52] U.S. Cl. .......... 173/16; 91/401; 91/325

[58] Field of Search .......... 173/134, 105, 13, 15, 173/16, 17; 92/163; 91/401, 325

[56] References Cited

U.S. PATENT DOCUMENTS

| | | | |
|---|---|---|---|
| 853,508 | 5/1907 | Frederick | 173/17 |
| 4,240,326 | 12/1981 | Carle | 91/401 |
| 4,367,672 | 1/1983 | Elser | 91/401 |

*Primary Examiner*—James M. Meister
*Assistant Examiner*—J. L. Knoble
*Attorney, Agent, or Firm*—Spensley, Horn, Jubas & Lubitz

[57] ABSTRACT

A starting arrangement for a reciprocating piston pneumatic hammer provides a passageway in the piston which couples a pneumatic piston subchamber to an exit port to exhaust pressurized pneumatic fluid from the subchamber to prevent the piston from centering.

4 Claims, 4 Drawing Figures

PNEUMATIC HAMMER

BACKGROUND OF THE INVENTION

1. Field of the Invention

The present invention relates to pneumatic apparatus, and, more particularly, to pneumatic apparatus having a reciprocating piston.

2. Description of the Prior Art

Pneumatic hammers typically utilize pressurized pneumatic fluids, such as pressurized air from an outside source, to drive a piston forward to impact a tool (such as a chisel) held within the hammer. Subsequently, pressurized pneumatic fluid drives the piston back to position the piston to again strike the tool. The piston reciprocates in this manner within a chamber of the hammer housing.

The piston typically divides the chamber into two subchambers, with one subchamber (often designated an "impact" subchamber) on one side of the piston and the other subchamber (or "retracting" subchamber) on the other side of the piston. Pressurized pneumatic fluid is supplied to the impact subchamber to drive the piston forward toward the tool. Generally, after the piston strikes the tool, pneumatic fluid is supplied to the retracting subchamber, thereby driving the piston back, while the pneumatic fluid within the impact chamber is allowed to exhaust through an exhaust port. Near the end of the piston's travel in the retracting direction, pneumatic fluid is resupplied to the impact subchamber and the pneumatic fluid within the retracting subchamber is allowed to exhaust, thus reversing the direction of the piston and causing it to again strike the tool. In this manner, a reciprocating motion of the piston is maintained.

A difficulty often encountered with pneumatic hammers is the tendency of the piston to "center" when attempting to start the hammer, especially when the hammer is held in a horizontal position. This problem occurs when the pneumatic hammer is unable to develop a sufficient pressure differential upon opposing faces of the piston dividing the impact and retracting subchambers during the start up phase. Consequently, the piston centers itself in the middle of the chamber and does not oscillate.

Prior attempts to alleviate the foregoing problem includes devices such as that shown in U.S. Pat. No. 3,785,248 to Bailey, in which pneumatic fluid pressure above that which is utilized during oscillation is supplied to one of the subchambers in order to start the piston oscillating. However, the devices described therein require an additional external conduit and external valve arrangement connecting the conduit to the pressurized fluid source to supply the additional pressurized fluid to the hammer. This can make a pneumatic hammer more difficult to connect to the source and more cumbersome to operate.

SUMMARY OF THE INVENTION

It is an object of the present invention to provide an improved pneumatic hammer in which the initiation of oscillation by the hammer piston is assured.

It is another object of the present invention to provide a pneumatic hammer having an improved hammer starting arrangement which is both relatively uncomplicated and economical to manufacture.

These and other objects and advantages are achieved in a pneumatic hammer having a specially ducted piston which is reciprocally carried within a hammer housing chamber. The duct or conduit within the hammer piston provides a passageway to exhaust pressurized pneumatic fluid from one of the subchambers to an exhaust port to prevent the piston from centering within the chamber.

As pressurized pneumatic fluid is introduced into the hammer chamber, a pressure differential is exerted upon a piston which drives it in a retracting or impacting motion, depending upon the initial position of the piston. If the piston is initially positioned such that neither subchamber is directly coupled to an exhaust port, the piston duct exhausts the pressurized fluid from one of the subchambers to develop a sufficient pressure differential to initiate the oscillating or reciprocating motion of the piston. Accordingly, the piston of the hammer is prevented from centering within the chamber.

BRIEF DESCRIPTION OF THE DRAWINGS

In the drawings.

Like numbers in the different figures refer to like elements.

DETAILED DESCRIPTION OF THE DRAWINGS

Figure 1:
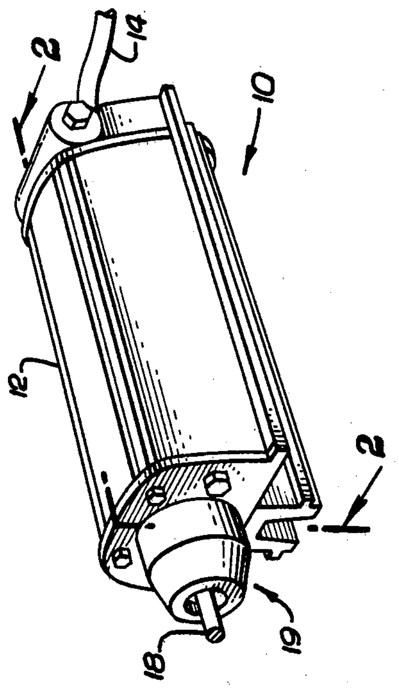
FIG. 1 is a perspective view of a pneumatic hammer in accordance with the present invention.

A pneumatic hammer 10 in accordance with the present invention is shown in FIG. 1 to have a generally cylindrically shaped housing 12. A supply hose 14 provides a pressurized pneumatic fluid such as pressurized air to the pneumatic hammer 10. The pressurized air causes a piston 16 (FIGS. 2-4) to oscillate or reciprocate within a chamber 20 of the housing 12. The reciprocating piston repeatedly strikes a tool such as a chisel 18 slidably retained by a nose assembly 19 within the housing 12 of the pneumatic hammer 10. As will be described in greater detail below, the piston 16 is provided with a duct or passageway which prevents the piston from "freezing up" or becoming immobilized in the center of the hammer chamber when starting up the hammer.

Figure 2:
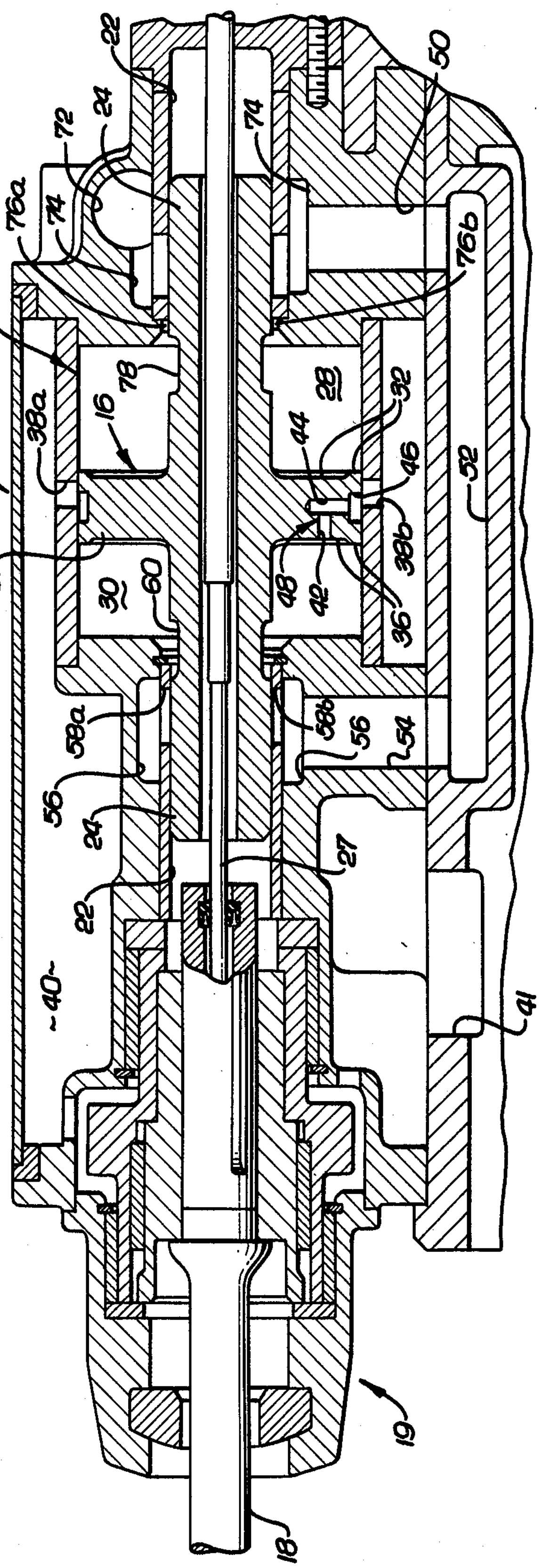
FIG. 2 is a partial cross-sectional view of the pneumatic hammer of FIG. 1, illustrating the piston of the hammer in an intermediate position.

Referring now to FIG. 2, the piston 16 is shown having a flange portion 21 which is slidably carried within the chamber 20. The housing 12 has a bore 22 smaller than and coaxial with the chamber 20, which carries a rod portion 24 of the piston 16. The piston 16 slides back and forth within the chamber 20 and bore 22, with the outside wall (26 FIG. 3) of the flange portion 21 making a substantially fluidtight slidable seal with the interior wall of the chamber 20. Both the piston 16 and the tool 18 are slidably carried over a central axial pin 27.

The piston 16 divides the chamber 20 into two subchambers 28 and 30. The subchamber 28 is defined by a rearward wall 32 of the flange portion 21, the rod portion 24 of the piston 16, and the interior walls of the chamber 20. The subchamber 28 is designated an "impact" subchamber since, when pressurized pneumatic air is introduced into the subchamber 28, the piston 16 is driven to the left (as seen in FIG. 2) until the rod portion 24 of the piston 16 impacts the shank of the tool 18.

The other subchamber 30 of the chamber 20 is defined by a forward face 36 of the flange portion 21, the rod portion 24 and the interior walls of the chamber 20, and is designated a "retracting" subchamber. Upon striking the tool 18, pressurized air is introduced into the retracting subchamber 30, which drives the piston 16 away from the tool 18 and to the right (as seen in FIG. 2). Upon reaching a particular point, the piston 16 is then driven back to the left by pressurized air introduced to the subchamber 28. The piston 16 continues back and forth in a reciprocating motion, repeatedly striking or impacting the tool 18.

Exhaust ports 38*a* and 38*b* are provided to exhaust the air from one subchamber as the other subchamber is being pressurized, thereby permitting a pressure differential to be developed on the flange portion faces 32 and 36 and allowing the piston 16 to be driven in one direction or the other. The exhaust ports 38*a* and 38*b* open out into an exhaust muffler chamber 40 which in turn is connected to a main exhaust port 41 through which the air in the exhaust chamber 40 exits to the outside of the housing 12.

The pressurized air is supplied from the hose 14 (FIG. 1) to a channel 72 within the housing 12 when the hammer is activated. The channel 72 opens up into an annular channel 74 which communicates with the bore 28 through inlet ports 76*a* and 76*b*. The rod portion 24 of the piston 16 has an annular groove 78 which, when aligned or registered with the inlet ports 76*a* and 76*b* by the retracting motion of the piston 16 to the right, provides an open passageway for pressurized air from the inlet ports 76*a* and 76*b* to the impact subchamber 28. During oscillation, pressurizing the subchamber 28 causes the piston 16 to reverse its direction of travel and move to the left to impact the tool 18.

Pressurized air in the annular channel 74 is also conducted by a radial channel 50 outward to an axial channel 52. The pressurized air is then conducted inward by a radial channel 54 from the channel 52 to s second annular channel 56, which communicates with the bore 30 through inlet ports 58*a* and 58*b*. The rod portion 24 of the piston 16 has a second annular groove 60 which, when aligned with the inlet ports 58*a* and 58*b* by the impacting motion of the piston 16 to the left (FIG. 4), allows pressurized air to be conducted into the retracting subchamber 30 to pressurize that subchamber.

During the impacting phase of normal piston oscillation, the face 32 of the flange portion 21 of the piston 16 moves past the exhaust ports 38*a* and 38*b*, directly coupling the impact subchamber 28 to the exhaust ports and thereby allowing the pressurized air within the impacting subchamber to be exhausted. After the piston 16 strikes the tool 18, the retracting subchamber 30 is in open communication with the input ports 58*a* and 58*b* through the groove 60 of the rod portion 24. Pressurized air is thus introduced to the retracting subchamber 30, and the piston is driven back to the right until the pressurized air within the retracting subchamber 30 in turn exhausts through the exhaust ports 38*a* and 38*b*. At that time, the impact subchamber 28 is in open communication with the ports 76*a* and 76*b* through the groove 78 of the rod portion 24, allowing the impact subchamber to repressurize to maintain the piston oscillation.

As can be seen in FIG. 2, there is a range of intermediate positions between the limits of the piston's travel in which the exhaust ports 38*a* and 38*b* are covered by the flange portion 21 of the piston 16. Since neither face 32 nor face 36 of the flange portion 21 has moved past the exhaust ports, neither subchamber 28 nor 30 is in direct communication with the exhaust ports. If it is attempted to start the hammer in a substantially horizontal position with the piston 16 in such an intermediate position, in the absence of the present invention, both subchambers 28 and 30 can becomes pressurized by air leaking into them around the hammer rod portion 24. This can in turn result in an insufficient net force acting upon the piston 16 such that the piston 16 becomes centered in an intermediate position and is prevented from oscillating.

Figure 4:
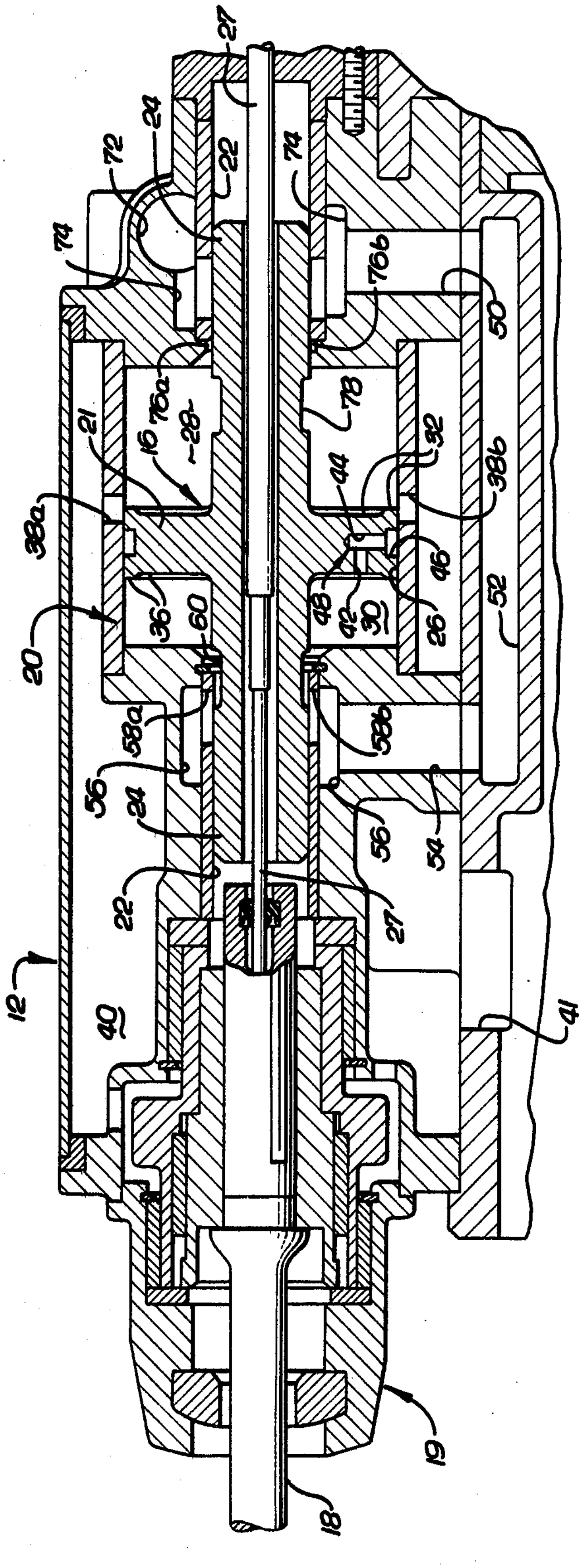
FIG. 4 is partial cross-sectional view of the pneumatic hammer of FIG. 1, illustrating the piston leaving the intermediate position.

The same result can obtain when the piston 16 is initially displaced from the intermediate positions. For example, if the initial position of the piston 16 is at the extreme left (as shown in FIG. 4), the impact subchamber 28 is open to the outside through exhaust ports 38*a* and 38*b*. Thus, when the hammer is activated only the retracting subchamber 30 will be pressurized, causing the piston 16 to move to the right. However, as soon as the piston 16 travels sufficiently far to the right to cover and block the exhaust ports 38*a* and 38*b*, the impact subchamber 28 will begin to pressurize and the piston 16 may not has sufficient momentum to overcome the pressure in the impact subchamber 28. Thus, the piston 16 can again stop or center at an intermediate position. Moreover, the problem of the piston centering can occur when the hammer is started in any position. Cold or non-circulating lubricants, or impurities within the lubricant or related problems, can hamper the starting of the piston oscillation.

In order to eliminate this problem, the piston 16 has a duct or conduit 42 (FIGS. 2–4) from the forward face 36 of the flange portion 21 to a second conduit 44. The conduit 44 extends radially outward and is connected to a circumferential groove 46 centered in the outside wall 26 of the flange portion 21. The conduits 42 and 44 and annular groove 46 form a piston passageway 48 which couples the retracting subchamber 30 to the exhaust ports 38*a* and 38*b* when the piston 16 is in the intermediate positions, as shown in FIG. 2.

Figure 3:
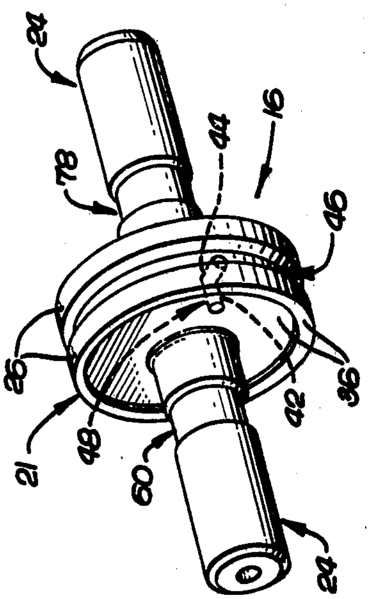
FIG. 3 is a perspective view of the piston of FIG. 2.

If pressurized air is supplied to start the hammer 10 when the piston 16 is in an intermediate position, the retracting subchamber 30 will be coupled through the passageway 48 to the exhaust ports 38*a* and 38*b*. The piston passageway 48 insures that an adequate pressure differential will develop against the flange portion faces 32 and 36 to move the piston 16 to the left in an impacting motion. As the piston 16 moves to the left, the passageway 48 is uncoupled from the exhaust ports 38*a* and 38*b* and the impacting subchamber 28 is coupled to the exhaust ports, as shown in FIG. 3. After the piston 16 strikes the tool 18, the retracting subchamber 30 (now uncoupled from the exhaust ports 38*a* and 38*b*) pressurizes through the piston groove 60, reversing the motion of the piston 16 in a retracting motion to the right. As the piston 16 moves to the right, the pressurized air in the retracting subchamber 30 will initially exhaust through the piston passageway 48 when the circumferential groove 46 of the piston registers with the exhaust ports 38*a* and 38*b*. After the forward face 36 of the piston flange portion 21 passes the exhaust ports 38*a* and 38*b*, the retracting subchamber 30 will be coupled directly with the exhaust ports 38*a* and 38*b* while the impacting subchamber 28 repressurizes through the piston groove 78. The direction of travel of the piston 16 will then reverse to the impacting motion. The oscillating motion of the piston 16 will continue as long as the pressurized air is supplied.

As can be seen from the foregoing, a simple, reliable pneumatic hammer starting arrangement is provided which insures that the piston will begin oscillating regardless of the initial position of either the hammer or the hammer piston. Furthermore, a hammer starting arrangement in accordance with the present invention does not require an additional source of pneumatic pressure or additional external conduits and the like.

It will, of course, be understood that modifications of the present invention, in its various aspects, will be apparent to those skilled in the art, some being apparent only after study and others being merely matters of routine mechanical design. For example, the piston passageway 48 can couple the impacting subchamber (rather than the retracting subchamber) to the exhaust ports in the intermediate piston positions. In which case, the impacting subchamber 28 becomes the low pressure chamber and the retracting subchamber 30 becomes the high pressure chamber, moving the piston 16 to the right instead of the left at the start.

In addition, the present invention is applicable to drills and other pneumatic devices having a reciprocating piston. As such, the scope of the invention should not be limited by the particular embodiment herein described, but should be defined only by the appended claims and equivalents thereof.

Various features of the present invention are set forth in the following claims.

I claim:

1. In a pneumatic hammer for repeatedly inpacting a tool, said hammer having a housing which has an inner wall which defines a chamber, a piston reciprocally carried within the chamber and having a wall which slidably engages the chamber wall, said piston defining an impact subchamber of the chamber wherein pneumatic fluid supplied under pressure to the impact subchamber from an outside source drives the piston to impact the tool, the piston also defining a retracting subchamber of the chamber wherein pneumatic fluid supplied under pressure to the retracting subchamber drives the piston back from the tool, an exhaust port in the chamber wall which provides an outlet from the chamber, said piston having a first position wherein the exhaust port is coupled to the impact subchamber so as to exhaust pneumatic fluid under pressure from the impact subchamber, a second position wherein the exhaust port is coupled to the retracting subchamber so as to exhaust pneumatic fluid under pressure from the retracting subchamber, and a third position intermediate the first and second positions in which the exhaust port is covered by the piston, the improvement comprising:

a passageway located in the piston and coupled to one of the subchambers, said passageway having an outlet located in the piston wall, which registers with the exhaust port when the piston is in the intermediate position wherein only said one of the two subchambers is coupled to the exhaust port when the piston is in the intermediate position and pneumatic fluid may be exhausted from only said one subchamber to prevent the piston from stalling in the intermediate position.

2. The hammer of claim 1 wherein the passageway is coupled to the retracting subchamber wherein pneumatic fluid is exhausted from only the retracting subchamber of the two subchambers in the intermediate position.

3. In a pressurized air hammer for repeatedly impacting a tool, said hammer having a housing which has an inner wall which defines a chamber, a piston reciprocally carried within the chamber and having a wall which slidably engages the chamber wall, said piston defining an impact subchamber of the chamber wherein pressurized air supplied to the impact subchamber from an outside source drives the piston to impact the tool and the piston also defining a retracting subchamber of the chamber wherein pressurized air supplied to the retracting subchamber drives the piston away from the tool, at least one exhaust port in the housing, said piston having during operation a first position wherein the impacting subchamber is coupled an exhaust port to exhaust air from the impacting subchamber, a second position wherein the retracting subchamber is coupled to an exhaust port and a third position intermediate the first and second positions in which neither of the subchambers is coupled to an exhaust port, the improvement comprising:

a circumferential groove in said piston wall; and a passageway in said piston coupling the retracting subchamber to the circumferential groove;

said circumferential groove being located in the piston wall so as to couple the retracting subchamber through the passageway and circumferential groove to an exhaust port when the piston is in the intermediate position;

wherein only the retracting subchamber is coupled to the exhaust port and the impact subchamber is uncoupled from the exhaust port when the piston is in the intermediate position.

4. A pneumatic apparatus comprising:

a housing including a central chamber therein;

a piston reciprocally carried within the chamber, said piston separating the chamber into an impact subchamber and a retracting subchamber;

means for supplying pressurized fluid alternately to each of the subchambers;

an exit port located in the housing to enable pressurized fluid to escape from the chamber, wherein during operation of the apparatus the piston will reciprocate so that said port will be sequentially coupled to the impact subchamber to permit fluid to escape therefrom, covered by the piston, and coupled to the retracting subchamber to permit fluid to escape therefrom; and conduit means, located in the piston and coupled to only one of the subchambers, for coupling only the one subchamber to the exit port when the piston covers the exit port to thereby enable fluid under pressure to escape from said one subchamber through said exit port and pressure is prevented from escaping from the other subchamber when the exit port is covered by the piston to enable reciprocation of the piston to be started even if the exit port is covered by the piston.

* * * * *